__United States Patent Office__  3,730,700
Patented May 1, 1973

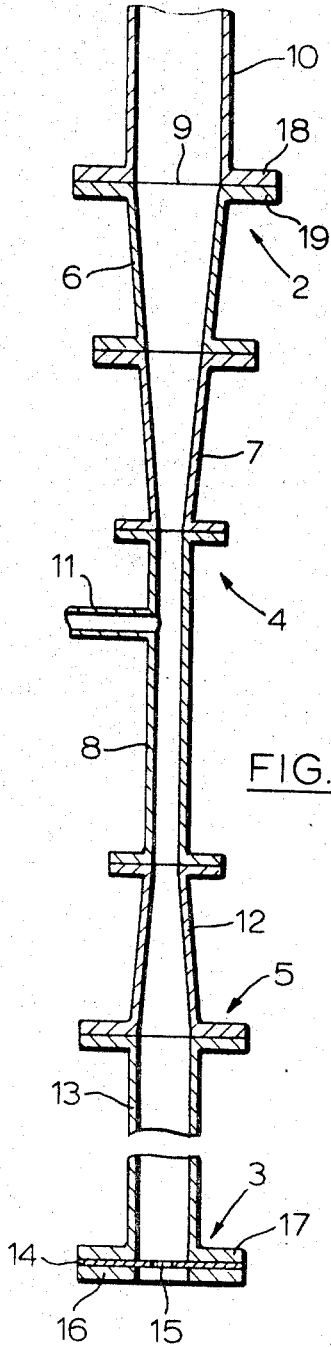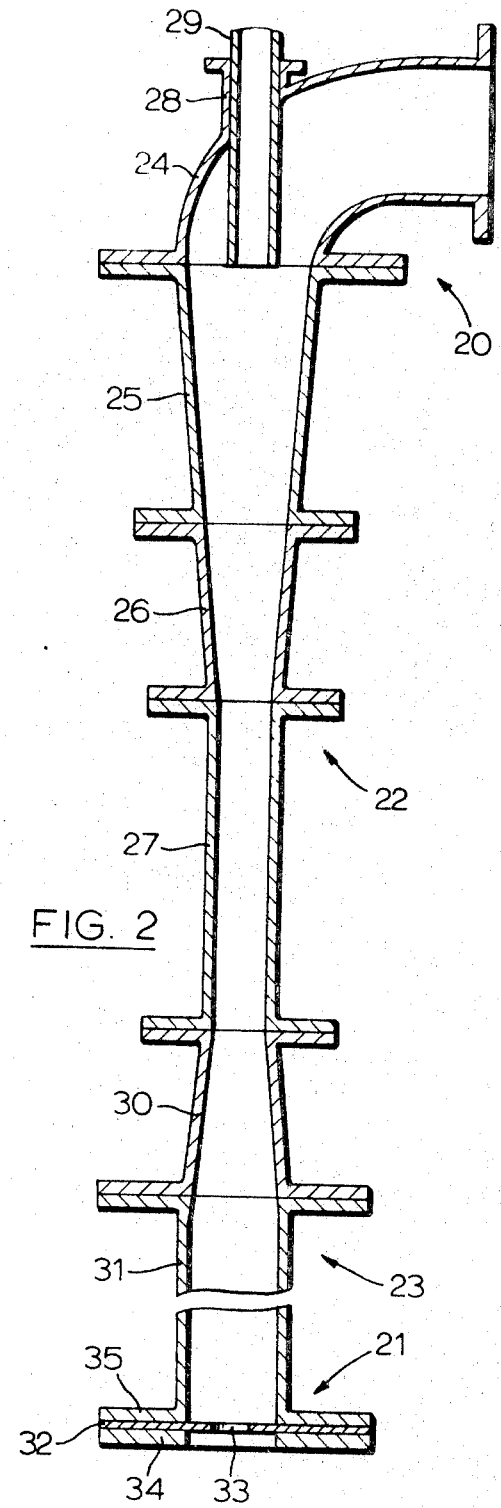

3,730,700
PROCESS FOR THE PRODUCTION OF AMMONIUM PHOSPHATE FERTILIZERS
Pieter Groenveld, Rijswijk, Netherlands, assignor to Cominco Ltd., Trail, British Columbia, Canada
Filed July 6, 1970, Ser. No. 52,613
Claims priority, application Canada, July 7, 1969, 56,313
Int. Cl. C05b 7/00
U.S. Cl. 71—34                                6 Claims

ABSTRACT OF THE DISCLOSURE

A process and apparatus for the production of ammonium phosphate fertilizer material in which gaseous anhydrous ammonia and phosphoric acid are reacted under pressure in a confined, elongated reaction zone under high velocity condition to prevent the deposition of solid reaction products within the reaction zone.

BACKGROUND OF THE INVENTION

The present invention relates to a continuous process for the production of ammonium phosphate fertilizer materials by the reaction of ammonia and an aqueous phosphoric acid solution and to an apparatus in which such a process may effectively be carried out.

In the manufacture of ammonium phosphate fertilizers from rocks of the apatite type, the crushed rock is treated with sulphuric acid to produce phosphoric acid which is separated from the solids, and the resulting wet process acid is neutralized with ammonia to provide the desired product. In the conventional process for carrying out such neutralization, the wet process acid is reacted with ammonia in one or more agitated tanks. The disadvantages of this process are well known to those skilled in the art and are adequately enumerated in the published literature.

In the last decade, several proposals have been made for avoiding the disadvantages of the conventional process. These have involved the use of confined, elongated reactors into which the acid and ammonia are introduced for reaction therein and from which the resulting reaction mixture is discharged. The discharged reaction mixture is subsequently treated for the recovery of the product in its desired form. In some cases this recovery is preceded by an additional separation step wherein steam, together with any unreacted ammonia and other volatile impurities, is separated from the ammonia phosphate.

One important problem which has arisen in the use of confined, elongated reactors results from the deposition of solid products, essentially comprising ammonium phosphates, on the internal walls of the reactors. Another problem which arises in such processes is the formation of citrate-insoluble $P_2O_5$ in the final products. Since such material cannot be included in the available $P_2O_5$ content as specified for sales purposes, it constitutes a loss to the manufacturer. This latter problem is particularly serious in the case of phosphoric acid prepared from rock containing relatively large amounts of magnesium, iron and aluminum.

Several proposals have been made for reducing the extent of solids deposition in such reactors and for limiting back-mixing of the reaction mixture to prevent the formation of large percentages of citrate-insoluble $P_2O_5$. These processes have involved for instance the provision of transverse baffles within the reactors to prevent back-mixing and to increase the degree of turbulence within the reaction mixture inside the reactor. It has also been proposed to provide thermal insulation and even heating jackets around the reactor wall to maintain the temperature of the reactor wall sufficiently high in an effort to obviate product deposition thereon.

SUMMARY OF THE INVENTION

The present invention is based on the discovery that such deposition of solid products on the inside surface of the wall of such a confined, elongated reactor used for the neutralization of wet process phosphoric acid with ammonia can be substantially eliminated by the design of the reactor and by maintaining the feed rates of the acid and ammonia thereinto at such values that the resulting reaction mixture travels through the reactor at a high speed which must be at least sufficient per se to maintain turbulence of the reaction mixture and which is also at least sufficient to prevent back-mixing of the reaction mixture and to prevent the undesirable deposition of solid reaction products on the reactor wall.

DESCRIPTION OF THE PROCESS OF THE INVENTION

The speed with which the reaction mixture must travel through the reaction zone in order to satisfy these conditions can best be expressed in the velocity of the ammonia calculated approximately at the point of entrance to the reactor.

The required travelling speed of the reaction mixture through the reaction zone, and thus the required velocity of the ammonia, is to some extent dependent on the design of the reactor as well as on the nature of the phosphoric acid used.

I have found in general that a velocity of the ammonia, as defined above, of at least 100 feet per second is required to prevent the deposition of solid reaction products on the reactor wall and to prevent back-mixing of the reaction mixture.

It will be understood that, because in the process of the invention, the velocity of the reaction mixture through the reaction zone is so high, its retention time within the reaction zone will be very short unless a reactor having an excessive length were to be used. For this reason, it is essential in the process of the invention to provide the optimum reaction conditions within the reaction zone so as to ensure that the reaction between the acid and the ammonia is substantially complete by the time that the reaction mixture is discharged from the reaction zone.

A prime requirement for ensuring that the reaction occurs rapidly is to provide intimate admixture of the reactants when they are introduced into the reaction zone. Such intimate admixture can be obtained in several ways. It can be obtained for example by means of a special feeding device such as spray nozzles through which the reactants are introduced into the reaction zone in the form of fogs or mists which are admixed by the turbulence existing within the reaction zone. I have found that it is not necessary to use such special feeding devices for the reactants and that a direct injection of the reactants under pressure into the feeding end of the reaction zone will achieve the desired results.

A further feature of the invention is that the reaction mixture is maintained within the reaction zone at an elevated pressure. Maintaining an elevated pressure within the reaction zone increases the rate of reaction between the acid and the ammonia, which is necessary to complete the reaction within the very short residence time in the reactor, as well as increases the amount of ammonia which can be absorbed yielding higher nitrogen contents in the reaction mixture whereby the need for feeding an excess of ammonia is essentially obviated. Moreover, the fluidity of the reaction mixture is also much improved. Another advantage of maintaining the reaction mixture in the reaction zone at an elevated pressure is the ability to directly feed the reaction mixture from the reaction zone into a granulating device, the reaction by-products, such as water or steam, being eliminated from the product by flash evaporation as the reaction mixture is discharged from the reaction zone.

Accordingly, in its broadest scope, the process of the present invention comprises introducing ammonia and aqueous wet process phosphoric acid into a confined, elongated reaction zone under elevated pressure so as to ensure intimate admixture thereof to form a reaction mixture, the feed rates of said ammonia and said phosphoric acid solution being such as to ensure that said reaction mixture travels through said reaction zone at a linear velocity at least sufficient to maintain turbulence of said reaction mixture and at least sufficient substantially to prevent both back-mixing of said reaction mixture and the deposition of solid reaction products within said reaction zone, and discharging said reaction mixture from said reaction zone after substantially complete reaction between said ammonia and said phosphoric acid.

The wet process phosphoric acid can be used with or without a preconcentration step and will normally have a $P_2O_5$ content of from 35 to 62% by weight. If desired, the acid feed to the reaction zone can be preheated to increase the $P_2O_5$ content of the reaction product as a result of dehydration of the acid from the ortho-phosphoric form to the form of polyphosphoric acids.

It will further be understood that the water content of the reaction product can be regulated by using a suitable acid feed and/or by the use of a preheating step. For example, when phosphoric acid is reacted to make ammonium phosphates without subsequent drying, an 11–48–0 grade product can be made using a particular acid feed containing about 42% $P_2O_5$ and having a specific gravity of about 1.5, without preheating, or an acid having a lower specific gravity can be used provided that such an acid is preheated. Similarly, an acid feed having a specific gravity of about 1.5 can itself be preheated for the production of an 115–55–0 grade product.

For the production of high grade ammonium phosphates such as the 10–60–0 grade, it is necessary to utilize an acid feed having a high $P_2O_5$ content, as well as preheating. In general, when the acid feed is preheated, the maximum temperature for preheating will normally be about 150° C.

In the production of, for example, mono- and diammonium phosphates, the phosphoric acid preferably contains from about 35 to about 45% $P_2O_5$, while for ammonium polyphosphate the feed acid preferably should contain more than 55% $P_2O_5$ and, more preferably, about 62% $P_2O_5$. The use of a more dilute acid, for the production of mono- and diammonium phosphates, is necessary to prevent the reaction zone from attaining temperatures at which polyphosphate species are formed.

It will be understood that the expressions "phosphoric acid" and "ammonium phosphate" when used herein are intended to embrace all the aforementioned materials as well as such materials also containing sulphate radicals.

The ammonia will be fed to the reaction zone as gaseous anhydrous ammonia under pressure and may be supplied at ambient temperature or may be preheated.

In the cases of production of monoammonium phosphates and ammonium polyphosphates, the acid and ammonia are fed to the reactor in stoichiometric amounts. Thus it has been shown unnecessary to feed an excess of ammonia in order to obtain the necessary nitrogen content in the final product.

An important advantage of feeding acid and ammonia in stoichiometric amounts is that no unreacted ammonia is discharged from the reactor and consequently no separation and recovery of such ammonia is necessary. If, however, diammonium phosphates, such as an 18–46–0 grade product, are desired, the amount of ammonia used must be increased and ammonia will then be present in the reaction mixture discharged from the reaction zone. Such ammonia is usually recovered by conventional methods. An advantage of the present invention is that the use of elevated pressure in the reaction zone allows the amount of ammonia reacted to form ammonium phosphate to be increased so that any ammonia in the reaction mixture will be considerably less than if the reaction zone were maintained at a non-elevated pressure. As a result, the excess of ammonia necessary to form diammonium phosphates is small and is usually absorbed during the subsequent granulation process so that no ammonia losses occur.

As hereinbefore indicated, the process of the present invention involves the important feature of maintaining the reaction zone at an elevated presseure. Normally, the pressure in the reaction zone will be at least 30 pounds per square inch gauge (p.s.i.g.) and will not exceed about 200 p.s.i.g. and will preferably be maintained in the range of from about 30 to about 80 p.s.i.g. The elevated pressure desired in the reaction zone can be maintained by the use of a restricted discharge opening as will be more fully explained hereinafter with reference to the description of a suitable apparatus for carrying out the process of the invention.

The maintaining within the reaction zone of a linear velocity for the reaction mixture sufficient to ensure turbulence and sufficient to prevent back-mixing and deposition of solid products is a critical feature of the invention. Although it is known what the approximate composition of the reaction mixture in the reaction zone is, it is not certain in what phase each one of the components of the mixture is present so that it is difficult to determine the actual linear velocity of the reaction mixture as it flows through the reactor. However, the velocity of the gaseous ammonia in the reactor, approximately at the point of entrance to the reactor, can be calculated with an acceptable degree of accuracy. It was found that by controlling the velocity of the ammonia above a certain limit, calculated approximately at the point of entrance to the reactor, the velocity of the reaction mixture could be controlled so that its turbulence was ensured and undesirable deposition of solid reaction products on the reactor wall was prevented. As stated, the minimum velocity of the ammonia at this point will be of the order of 100 feet per second. This minimum velocity of the ammonia, calculated approximately at its point of entrance to the reactor, of 100 ft./sec., may vary slightly depending on the quality of the acid. Velocities below 100 ft./sec. will result in the formation of solid deposits on the wall of the reactor. In general, velocities of the order of from about 100 to about 250 ft./sec. will be used.

As will be explained hereinafter, it is useful to provide a first reactor zone at the input end of the reactor to provide a very high velocity for the purpose of providing the desired degree of admixture of the acid and the ammonia and to impart a sufficiently high velocity to the reaction mixture in the second reactor zone which defines the remainder of the reactor to prevent back-mixing and scaling. The velocity of the reaction mixture is generally lower than the velocity of the ammonia.

The absence of back-mixing of the reaction mixture provides a continuous forward transport of the reaction mixture which not only reduces ammonia losses but also reduces the retention time for the reaction mixture.

The retention time of the reaction mixture within the reaction zone is generally less than one second and usually less than 0.1 second.

An important advantage of the present invention which results from the use of such low retention times and the absence of back-mixing and scaling is that the citrate-insoluble $P_2O_5$ (C.I./$P_2O_5$) content of the final product is considerably reduced and is normally less than 0.1%. This is particularly important in the case of wet process acids having high contents of impurities such as iron, aluminum and magnesium.

The ammonia preferably is fed to the reaction zone as gaseous anhydrous ammonia. When the reaction zone pressure is within the preferred range of 30 to 80 p.s.i.g., the ammonia feed pressure will normally be in the range of from about 40 to about 90 p.s.i.g. In the cases of production of mono- and diammonium phosphates, ammonium hydroxide may also be fed to the reactor.

The process of the invention usually is operated completely autothermally, but additional heat may be provided to the reaction zone, if so desired, for example, by preheating the acid feed or the ammonia feed, or both.

A further advantage resulting from the use of high velocities of the reaction mixture within the reaction zone is that the configuration and the disposition of the reactor are not critical. The reactor may, for example, be of straight, curved, or bent configuration and may be operated horizontally, vertically or inclined with either an upward or a downward flow of the reaction mixture therethrough.

And another advantage resulting from the use of high velocities of the reaction mixture is that the heat transfer between the reaction mixture and the reactor wall is significantly reduced thereby reducing the heat losses.

The temperatures in the reaction zone vary with the product being produced and range from about 100° C. for the production of monoammonium phosphates to about 300° C. for ammonium polyphosphates.

At the temperatures in the reactor whereby ammonium polyphosphates are produced and under the pressures at which the process is operated, it is likely that some water may exist in solution in the ammonium polyphosphate melt. This water content of the melt will increase the fluidity of the melt and will also increase ammonia absorption.

On leaving the reaction zone the reaction mixture passes through a restricted discharge opening and the pressure is reduced, consequently the moisture content of the reaction mixture is substantially reduced by flash-evaporation. Gaseous impurities and particularly fluorides present in the reaction mixture are also eliminated from the reaction product during the flash-evaporation.

The liquid reaction product leaving the reaction zone is subsequently cooled and solidified to form a solid ammonium phosphate or can be sprayed directly into water or into an aqueous solution to provide valuable liquid fertilizer products, for example, a liquid fertilizer product of 11-40-0 or 10-34-0 grade, or to provide suspension fertilizer products such as, for example, of a 12-44-0 grade.

The cooling and solidification can be effected in any convenient manner. They may, for example, be effected by spraying the liquid reaction product onto a cooled moving belt on which the reaction product solidifies and from which it can be removed by a scraping device to give a flaky product. This product may itself be subsequently dissolved to provide a liquid fertilizer.

In accordance with a particularly useful feature of the invention, the liquid product discharging from the reaction zone is fed to a granulating device such as a blunger in which the granulation is seeded with finely divided ammonium phosphate fertilizer product obtained from a subsequent classification or screening step. As a result of the flash-evaporation of the steam and other gaseous impurities from the reaction mixture during its discharge from the reaction zone, no separate drying step generally will be required after the granulation. After the granulation, the product is air-cooled in a rotating drum, and then screened. The oversize granules are then crushed and returned to the blunger together with the undersize particles. The recirculation ratio of recycle material to the blunger to product discharged from the reactor is usually from about 5:1 to about 8:1.

Although, as pointed out hereinbefore, a special feeding device for the reactants or separate feeding devices for each one of the reactants may be used to introduce the reactants into the reactor, it was found that direct injection of the reactants into the reactor obviated the necessity for such devices.

It has been found particularly beneficial to inject the phosphoric acid transversely into an injected and accelerated stream of ammonia, or alternatively, to inject both the acid and the ammonia into the feeding end of the reactor and accelerate the velocities of the combined streams of acid and ammonia.

The invention also embraces an apparatus suitable for obtaining this result and, in its broadest scope, such an apparatus comprises an elongated reactor having an inlet end and an outlet end, a first reactor zone extending from said inlet end to a second reactor zone having a greater cross-sectional area than said first reactor zone and itself extending to said outlet end, means for feeding ammonia and aqueous phosphoric acid solution into said first reactor zone at an elevated pressure for intimate admixture therein, and a restricted opening at said outlet end for the discharge of a reaction mixture from said second reactor zone.

In accordance with the invention, a first embodiment of such an apparatus comprises a first inlet means for feeding gaseous ammonia axially into said reactor and a second inlet means for feeding phosphoric acid solution transversely into a fast moving stream of ammonia issuing from said first inlet means along said first reactor zone.

By having the internal cross-sectional area of the first reactor zone decrease gradually in a downstream direction from the first inlet means, i.e., the ammonia inlet means, and adding the acid through the acid inlet means in the area with the smallest cross-sectional area of said first reactor zone, rapid acceleration of the ammonia takes place which will cause an extremely high degree of turbulence whereby intimate admixture of the ammonia and the acid is ensured.

The second reactor zone is provided with a larger diameter than the first reactor zone to allow the retention time necessary for completion of the reaction between acid and ammonia.

Alternatively, a second embodiment of such an apparatus comprises a first inlet means for feeding gaseous ammonia and a second inlet means for feeding phosphoric acid axially into said first inlet means within said first reactor zone. By having the internal cross-sectional area of the first reactor zone decrease gradually in a downstream direction from said first inlet means, a rapid acceleration of the ammonia and the acid takes place which will cause an extremely high degree of turbulence whereby intimate admixture of the ammonia and the acid is ensured.

The second reactor zone has a larger diameter than the first reactor zone to allow the retention time necessary for completion of the reaction between acid and ammonia.

The outlet end of the reactor may be disposed so as to discharge directly into a granulating device such as a blunger.

BRIEF DESCRIPTION OF THE DRAWINGS

The apparatus of the invention will now be described merely by way of illustration with reference to the accompanying drawing, in which:

FIG. 1 is an axial section through the first embodiment of an apparatus in accordance with the invention; and FIG. 2 is an axial section showing the alternative second embodiment of the apparatus in accordance with the present invention.

DESCRIPTION OF THE PREFERRED EMBODIMENT

The apparatus shown in FIG. 1 comprises an elongated reactor having an inlet end 2 and an outlet end 3. A first reactor zone, designated generally by numeral 4, has a configuration defined by converging frusto-conical members 6 and 7, and a cylindrical member 8. Member 6 is provided with an inlet 9 for the axial introduction of gaseous ammonia under pressure into the first reactor zone through the ammonia feed line 10, while cylindrical member 8 is provided with an inlet 11 for the lateral introduction of a stream of acid into the accelerated stream of ammonia discharging from frusto-conical members 6 and 7.

At its downstream end, the first reactor zone 4 communicates with a second reactor zone generally indicated at 5 having an upstream diverging frusto-conical member 12 and a downstream generally cylindrical member 13. The downstream end of said cylindrical member 13 is closed by an end plate 14 having an axial orifice 15 defining a restricted discharge opening therethrough.

In the construction illustrated in FIG. 1, the several sections of the reactor are interconnected in a fluid-tight manner by radially extending annular end flanges as shown, secured together in a conventional manner, for example, by bolts (not shown).

End plate 14 normally is retained in position by annular member 16 secured to flange 17. The ammonia feed line 10 also is normally provided with flange 18 for securing said ammonia feed line to the reactor flange 19.

A reactor constructed from stainless steel in accordance with FIG. 1 had the following dimensions:

|  | Inches |
|---|---|
| Ammonia feed line 10, internal diameter | 3 |
| Acid inlet 11, internal diameter | ¾ |
| Frusto-conical section 6, length | 6 |
| Frusto-conical section 7, length | 6 |
| Generally cylindrical section 8: | |
| Length | 12 |
| Internal diameter | 1 |
| Fusto-conical section 12, length | 6 |
| Generally cylindrical section 13: | |
| Length | 90 |
| Internal diameter | 2 |
| Discharge opening 15, diameter | 1¾ |

The apparatus shown in FIG. 2 comprises an elongated reactor having an inlet end 20 and an outlet end 21. A first reactor zone, designated generally by numeral 22 has a configuration defined by curved member 24 for the axial introduction of gaseous ammonia into the reactor, converging frusto-conical members 25 and 26 and a cylindrical member 27. Curved member 24 is provided with an inlet 28 through which the acid feed line 29 is inserted as indicated. The acid is introduced along the longitudinal axis of the reactor into the stream of ammonia.

At its downstream end, the first reactor zone 22 communicates with a second reactor zone generally indicated at 23 having an upstream diverging frusto-conical member 30 and a downstream cylindrical member 31. The downstream end of said cylindrical member 31 is closed by an end plate 32 having an axial orifice 33 formed therein defining a restricted discharge opening therethrough.

The members of the apparatus illustrated in FIG. 2 are interconnected by flanges secured together in a conventional manner.

End plate 32 is normally retained in position by an annular member 34 secured to flange 35. The ammonia feed line (not shown) is normally secured to the upstream end of curved member 24 by a flange connection.

A reactor constructed from stainless steel in accordance with FIG. 2 had the following dimensions:

|  | Inches |
|---|---|
| Ammonia feed line, internal diameter | 4 |
| Acid inlet 29, internal diameter | 1½ |
| Frusto-conical section 25, length | 10 |
| Frusto-conical section 26, length | 6 |
| Cylindrical member 27: | |
| Length | 12 |
| Internal diameter | 2 |
| Frusto-conical section 30, length | 6 |
| Cylindrical member 31: | |
| Length | 54 |
| Internal diameter | 3 |
| Discharge opening 31, varied between 1.5 and 2 inches. | |

The following examples are given by way of illustration of the process and apparatus according to the invention.

EXAMPLE I

The apparatus illustrated in FIG. 1 having the dimensions as described above was used to produce an 11–48–0 grade ammonium phosphate.

Wet process phosphoric acid containing 39.1% $P_2O_5$ having a specific gravity of 1.51 was fed radially into the first reactor zone under a pressure of 66 p.s.i.g. and a temperature of 60° C. at a rate of 453 lb./min. Anhydrous liquid ammonia was vaporized and the gaseous ammonia was fed to the reactor at a rate of 48 lb./min. under a pressure of 68 p.s.i.g.

The reaction mixture discharging from the reactor was mixed with recycled product fines in a blunger. The blunger product analyzed 11.5% N, 50.9% $P_2O_5$ and 0.1% citrate-insoluble $P_2O_5$ and contained 0.75% moisture.

The duration of the run was 12 hours. No scaling occurred in the reactor during the run.

EXAMPLE II

An apparatus of the type illustrated in FIG. 1 having an overall length of three feet had phosphoric acid with a specific gravity of 1.45 and containing 37.8% $P_2O_5$ fed radially into an axially flowing stream of gaseous ammonia in the first reactor zone under conditions generally the same as described in Example I so as to produce a diammonium phosphate. The product discharging from the reactor contained 17.5% N, 45.8% $P_2O_5$ and 11.4% water and had a pH of 7.9. After granulating the reactor product with recycled process fines and drying, the product analyzed 18–46–0.

EXAMPLE III

It is shown by Table I of this example that by varying the concentration of the phosphoric acid fed to the reactor and by varying the temperature of the acid feed, while maintaining all other process variables constant, ammonium phosphate products of different grades can be made. The apparatus used was the same as that used in Example II.

TABLE I

| Feed acid | | | Product | | |
|---|---|---|---|---|---|
| Percent $P_2O_5$ | Specific gravity | Temp., °C. | Percent N | Percent T/$P_2O_5$ | Percent non-ortho $P_2O_5$.[a] |
| 42.5 | 1.52 | 20 | 10.6 | 49.8 | |
| 42.5 | 1.52 | 60 | 11.0 | 50.8 | |
| 42.5 | 1.52 | 150 | 11.8 | 55.2 | |
| 57.7 | 1.78 | 150 | 11.0 | 59.8 | 53.7 |
| 58.0 | 1.89 | 150 | 11.1 | 60.1 | 76.8 |

[a] Expressed as percentage of total $P_2O_5$.

All products contained 0.1% C.I./$P_2O_5$ or less as determined by the official test of The Association of Official Agricultural Chemists. All products were dry in appearance and were analysed without prior drying.

EXAMPLE IV

This example illustrates that the production of ammonium phosphates without the use of an excess of ammonia can be accomplished when a restriction is used at the discharge end of the reactor. The results are shown in Table II below.

It is also shown, as seen in the tabulated results of runs number IV and V, that if the diameter of the restriction is too large a considerable excess of ammonia will be required to obtain the desired grade.

For the duration of these runs no deposits or scale formed in the reactor.

In these runs the apparatus used was that illustrated in FIG. 2 having the dimensions as described above.

In practice, operating the reactor at lower velocities of the reaction mixtures in the reactor, i.e., ammonia velocities of less than 100 ft./sec., resulted in scaling of the equipment within a very short period of operation as noticed by a rapidly increasing reactor pressure.

After granulation of the reaction product in the blunger with recycled product fines, the granules were cooled in a rotating drum with a countercurrent flow of air at ambient temperature and subsequently screened to produce a product fraction and under- and oversize material. The oversize material was crushed and returned to the blunger together with the undersize material. The final product in all cases contained less than 1% moisture confirming that no additional drying step for the product is required.

TABLE II

|  | Run No. | | | | |
|---|---|---|---|---|---|
|  | I | II | III | IV | V |
| Product | 11-48-0 | 11-55-0 | 10-60-0 | 11-48-0 | 11-55-0 |
| $NH_3$ inlet pressure, p.s.i.g. | 61 | 50 | 42 | 48 | 52 |
| $NH_3$ flow rate, lb./min. | 40.7 | 36.2 | 34.0 | 46.2 | 42.8 |
| $NH_3$ temperature, °C. | 110 | 110 | 130 | 110 | 118 |
| $NH_3$ excess, percent | 0 | 0 | 0 | 24 | 24 |
| Acid flow rate, lb./min. | 367 | 320 | 246 | 356 | 328 |
| Acid: | | | | | |
| S.G. | 1.47 | 1.60 | 1.89 | 1.49 | 1.56 |
| Percent $P_2O_5$ | 38.4 | 47.8 | 60.7 | 39.9 | 45.5 |
| Temp., °C. | 64 | 60 | 90 | 64 | 60 |
| $NH_3$ velocity, ft./sec. | 120 | 180 | 210 | 160 | 210 |
| Discharge velocity of reaction mixture, ft./sec. | 500 | 870 | 480 | 700 | 500 |
| Diameter of restriction, inches | 1¾ | 1½ | 1½ | 2 | 2 |
| Reactor pressure, p.s.i.g. | 49 | 40 | 37 | 38 | |
| Reactor temperature, °C. | 146 | 180 | 270 | 146 | 150 |
| Retention time, sec. | 0.09 | 0.09 | 0.08 | 0.06 | 0.08 |
| Product rate, lb./min. | 284 | 273 | 250 | 286 | 263 |
| Recycle to blunger, lb./min. | 1,766 | 1,351 | 1,631 | | 1,348 |
| Reactor discharge assay: | | | | | |
| Percent N | 11.8 | 11.9 | 11.2 | 10.6 | 10.8 |
| Percent $P_2O_5$ | 49.6 | 55.9 | 59.8 | 49.6 | 55.5 |
| Percent non-ortho $P_2O_5$ | | | 54.0 | | |
| Percent C.I./$P_2O_5$ | 0.1 | 0.1 | 0.1 | 0.1 | 0.1 |
| Percent W.S. $P_2O_5$ | 47.2 | 52.2 | 53.8 | 47.2 | 52.3 |
| Percent $H_2O$ | 8.2 | 2.3 | 0.1 | 8.3 | 2.2 |

What I claim as new and desire to protect by Letters Patent of the United States is:

1. A continuous process for the production of solid granulated ammonium phosphate by feeding ammonia and aqueous wet-process phosphoric acid into a confined, elongated reaction zone maintained under elevated pressure in which back-mixing of reaction mixture and deposition of solid reaction products are substantially prevented which comprises, in combination, the steps of:

preheating wet-process phosphoric acid containing 35 to 62% $P_2O_5$ to a temperature of up to 150° C.;

introducing into one end of said reaction zone an amount of gaseous anhydrous ammonia at a pressure of at least 10 pounds per square inch gauge above the pressure in said reaction zone;

simultaneously introducing into said reaction zone an amount of wet-process phosphoric acid, said amount of ammonia being sufficient for substantially complete reaction with said amount of acid with the formation of a reaction mixture containing ammonium phosphate;

accelerating the rate of flow of ammonia, acid and said reaction mixture through a first reactor zone of said reaction zone;

passing said reaction mixture to a second reactor zone of said reaction zone;

controlling the linear velocity of the reaction mixture in the reaction zone, expressed as the velocity of the gaseous ammonia entering the first reaction zone, in the range of from about 100 to 250 feet per second;

maintaining a pressure in said reaction zone in the range of from about 30 to 200 pounds per square inch gauge;

retaining the reaction mixture in the reaction zone until the reaction has been completed, the reaction time being less than 0.1 second;

discharging the reaction mixture from said second reactor zone through a restricted discharge opening therein at a velocity of from 480 to 870 feet per second whereby steam is flashed from the reaction mixture;

mixing the remaining reaction mixture with ammonium phosphate fines in a granulator to produce solid-granulated ammonium phosphate; and recovering said ammonium phosphate.

2. A process as claimed in claim 1 in which said acid is injected radially into an accelerated stream of said ammonia in a first reactor zone of said reaction zone having a reduced cross-sectional area with respect to a subsequent second reactor zone of said reaction zone.

3. A process as claimed in claim 1 in which the pressure within said reaction zone is from 30 to 80 pounds per square inch gauge.

4. A process as claimed in claim 1 in which said phosphoric acid is introduced coaxially with the introduced ammonia in said reaction.

5. A procss as claimed in claim 1 in which said ammonia is introduced into the reaction zone under a pressure of from about 40 to about 90 pounds per square inch gauge.

6. A process as claimed in claim 1 in which said ammonia is preheated.

References Cited

UNITED STATES PATENTS

| 3,346,808 | 9/1969 | Kearns | 71—34 |
| 3,503,706 | 3/1970 | Legal | 71—43 X |
| 3,419,378 | 12/1968 | Kearns | 71—34 |
| 2,902,342 | 9/1959 | Kerley | 71—43 X |
| 3,238,021 | 3/1966 | Webber et al. | 71—43 X |
| 3,523,784 | 8/1970 | Coon | 71—34 |
| 3,420,624 | 1/1969 | Fitch | 71—34 X |
| 3,539,327 | 11/1970 | Hudson | 71—34 |
| 3,310,371 | 3/1967 | Lutz | 23—107 |

SAMIH N. ZAHARNA, Primary Examiner

R. B. BARNES, Assistant Examiner

U.S. Cl. X.R.

423—310, 313